United States Patent
Liu

(10) Patent No.: US 9,759,978 B2
(45) Date of Patent: Sep. 12, 2017

(54) COMPOSITION AND PROCESS FOR SEALING MICROCELLS

(71) Applicant: E Ink California, LLC, Fremont, CA (US)

(72) Inventor: Lei Liu, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 14/880,081

(22) Filed: Oct. 9, 2015

(65) Prior Publication Data

US 2016/0109780 A1    Apr. 21, 2016

Related U.S. Application Data

(60) Provisional application No. 62/065,575, filed on Oct. 17, 2014.

(51) Int. Cl.
| | |
|---|---|
| *G02B 26/00* | (2006.01) |
| *G02B 26/08* | (2006.01) |
| *G02F 1/29* | (2006.01) |
| *G02F 1/167* | (2006.01) |
| *G02F 1/1339* | (2006.01) |
| *H01B 3/02* | (2006.01) |

(52) U.S. Cl.
CPC .......... *G02F 1/167* (2013.01); *G02F 1/1339* (2013.01); *H01B 3/02* (2013.01); *G02F 2001/1672* (2013.01); *G02F 2001/1678* (2013.01)

(58) Field of Classification Search
USPC ........ 359/237, 242, 265, 267, 290–296, 298
See application file for complete search history.

(56) References Cited

U.S. PATENT DOCUMENTS

| | | | |
|---|---|---|---|
| 3,612,758 A | 10/1971 | Evans et al. | |
| 4,430,182 A | 2/1984 | Hishida et al. | |
| 4,466,701 A | 8/1984 | Ogata et al. | |
| 5,576,129 A | 11/1996 | Zwarrtz et al. | |
| 5,635,322 A | 6/1997 | Zwartz et al. | |

(Continued)

FOREIGN PATENT DOCUMENTS

| | | |
|---|---|---|
| EP | 0 615 164 A | 9/1994 |
| EP | 0 980 067 A | 2/2000 |

(Continued)

OTHER PUBLICATIONS

Lei Liu and Jaime C. Grunlan (2007), Clay Assisted Dispersion of carbon Nanotubes in Conductive Epoxy Nanocomposites, Advanced Functional Materials, 2007, 17,p. 2343-2348.

(Continued)

*Primary Examiner* — Brandi Thomas
(74) *Attorney, Agent, or Firm* — Brian D. Bean

(57) ABSTRACT

The present invention is directed to a composition for the dielectric layer, which composition comprises a mixture of conductive filler material wherein said mixture consists of carbon nanotubes and graphite, and the dielectric layer formed comprises 0.01% to 7% by weight of carbon nanotubes and 0.1% to 20% by weight of graphite. The composition of the present invention may form a dielectric layer which has the desired electrical resistivity. In addition, the dielectric layer is expected to show better barrier properties, less moisture and temperature dependence and improved anisotropic properties.

14 Claims, 2 Drawing Sheets

(56) References Cited

U.S. PATENT DOCUMENTS

| | | | |
|---|---|---|---|
| 5,660,960 | A | 8/1997 | Kinoshita et al. |
| 5,908,585 | A | 6/1999 | Shibuta |
| 5,930,026 | A | 7/1999 | Jacobson et al. |
| 5,961,804 | A | 10/1999 | Jacobson et al. |
| 6,117,369 | A | 9/2000 | Shelnutt et al. |
| 6,124,409 | A | 9/2000 | Ng et al. |
| 6,174,636 | B1 | 1/2001 | Fuller et al. |
| 6,180,224 | B1 | 1/2001 | Shouji et al. |
| 6,211,274 | B1 | 4/2001 | Tanegashima et al. |
| 6,271,823 | B1 | 8/2001 | Gordon, II et al. |
| 6,323,989 | B1 | 11/2001 | Jacobson et al. |
| 6,333,754 | B1 | 12/2001 | Oba et al. |
| 6,407,763 | B1 | 6/2002 | Yamaguchi et al. |
| 6,411,316 | B1 | 6/2002 | Shigehiro et al. |
| 6,525,865 | B2 | 2/2003 | Katase |
| 6,538,801 | B2 | 3/2003 | Jacobson et al. |
| 6,541,128 | B2 | 4/2003 | Wehrmann et al. |
| 6,657,772 | B2 | 12/2003 | Loxley |
| 6,672,921 | B1 | 1/2004 | Liang et al. |
| 6,738,050 | B2 | 5/2004 | Comiskey et al. |
| 6,751,008 | B2 | 6/2004 | Liang et al. |
| 6,788,449 | B2 | 9/2004 | Liang et al. |
| 6,795,138 | B2 | 9/2004 | Liang et al. |
| 6,816,146 | B2 | 11/2004 | Harada et al. |
| 6,831,769 | B2 | 12/2004 | Holman et al. |
| 6,839,158 | B2 | 1/2005 | Albert et al. |
| 6,859,302 | B2 | 2/2005 | Liang et al. |
| 6,867,898 | B2 | 3/2005 | Liang et al. |
| 6,930,818 | B1 | 8/2005 | Liang et al. |
| 6,933,098 | B2 | 8/2005 | Chan-Park et al. |
| 7,012,735 | B2 | 3/2006 | Honeyman et al. |
| 7,256,766 | B2 | 8/2007 | Albert et al. |
| 7,347,957 | B2 | 3/2008 | Wu et al. |
| 7,504,050 | B2 | 3/2009 | Weng et al. |
| 7,616,185 | B2 | 11/2009 | Yamaguchi et al. |
| 7,800,813 | B2 | 9/2010 | Wu et al. |
| 7,880,958 | B2 | 2/2011 | Zang et al. |
| 8,179,589 | B2 | 5/2012 | Wu et al. |
| 8,222,077 | B2 | 7/2012 | Gong et al. |
| 8,547,628 | B2 | 10/2013 | Wu et al. |
| 8,830,561 | B2 | 9/2014 | Zang et al. |
| 2001/0055000 | A1 | 12/2001 | Kanae et al. |
| 2004/0085619 | A1 | 5/2004 | Wu et al. |
| 2006/0255322 | A1 | 11/2006 | Wu et al. |
| 2009/0189125 | A1 | 7/2009 | Grigorian et al. |
| 2010/0103501 | A1* | 4/2010 | Wang .............. G02F 1/167 359/296 |
| 2011/0281051 | A1 | 11/2011 | Dufaure et al. |
| 2012/0013971 | A1* | 1/2012 | Wu .................. G02F 1/167 359/296 |
| 2013/0141780 | A1 | 6/2013 | Jeon |
| 2014/0147478 | A1 | 5/2014 | Li et al. |
| 2014/0307039 | A1 | 10/2014 | Tamoto et al. |

FOREIGN PATENT DOCUMENTS

| | | |
|---|---|---|
| JP | 63-106662 | 5/1988 |
| JP | H03-037654 | 2/1991 |
| JP | H05-035152 | 2/1993 |
| JP | H07-005709 | 1/1995 |
| JP | 2000-310960 | 11/2000 |
| JP | 2002-040967 | 2/2002 |
| JP | 2002-131789 | 5/2002 |
| JP | 2002-214649 | 7/2002 |
| JP | 2002-236471 | 8/2002 |
| JP | 2002-297079 | 10/2002 |
| JP | 2000-347483 | 12/2002 |
| JP | 2003-318196 | 11/2003 |
| JP | 2001-034198 | 9/2011 |
| WO | WO 01/67170 | 9/2001 |
| WO | WO 02/01281 | 1/2002 |
| WO | WO 02/056097 | 7/2002 |
| WO | WO 02/065215 | 8/2002 |

OTHER PUBLICATIONS

PCT/US2015/054970, PCT Notification of transmittal of the International Search Report and The Written Opinion of the international Searching Authority, or the Declaration, dated Mar. 17, 2016.

Sprague, R.A. (Sep. 23, 2009) *SiPix Microcup Electrophoretic Epaper for Ebooks*. NIP 25, 2009 pp. 460-462. (Presentation conducted on Sep. 23, 2009 at the 25th Int'l Conference on Digital Printing Technologies, Digital Fabrication 2009 (NIP 25) by Society.

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Zang, H.M. (Sep. 2006) *Monochrome and Area Color Microcup®EPDs by Roll-to-Roll Manufacturing Process*. Presentation conducted at the Fourth Organic Electronics Conference and Exhibition (OEC-06), Sep. 25-27, 2006, Frankfurt, Germany.

Wang, X., Zang, H.M. and Li, P. (Jun. 2006) Roll-to-Roll Manufacturing Process for Full Color Electrophoretic film. *SID Digest*, 00pp1587-1589.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Wang, X., Li, P., Sodhi, D., Xu, T., Bruner, S and Hiraoka M. (Feb. 2006) *Inkjet Fabrication of Multi-Color Microcup® Electrophorectic Display*. The 5$^{th}$ Flexible Microelectronics & Displays Conference of U.S. Display Consortium (Feb. 2006).

Liang, R.C., (Feb. 2005) *Flexible and Roll-able Displays/Electronic Paper—A Brief Technology Overview*. Flexible Display Forum, 2005, Taiwan.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Ho, Candice. (Feb. 1, 2005) *Microcupt® Electronic Paper Device and Application*. Presentation conducted at USDC 4th Annual Flexible Display Conference 2005.

Bardsley, J.N. & Pinnel, M.R. (Nov. 2004) Microcup™ Electrophoretic Displays. *USDC Flexible Display Report*, 3.1.2. pp. 3-12-3-16.

Liang, R.C. (Oct. 2004) *Flexible and Roll-able Displays/Electronic Paper—A Technology Overview*. Paper presented at the METS 2004 Conference in Taipei, Taiwan.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Francisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

(56) References Cited

OTHER PUBLICATIONS

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Ho, C., & Liang, R.C. (Dec. 2003). *Microcup® Electronic Paper by Roll-to-Roll Manufacturing Processes*. Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Allen, K. (Oct. 2003). Electrophoretics Fulfilled. *Emerging Displays Review: Emerging Display Technologies, Monthly Report—Oct.* 2003, 9-14.

Kleper, M., Miller, P., Miller L. (Oct. 2003) An Investigation of the Emerging and Developing Technologies Related to the Generation Beyond Print-on-Paper. *Advanced Display Technologies*, Oct. 2003, pp. 13-15, Rochester Institute of Technology (R.I.T.).

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Chen, S.M. (May 2003) The New Application and the Dynamics of Companies. *TRI*. 1-10. (In Chinese, English abstract attached).

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, p. 3. (in Japanese, with English translation).

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Ye, YA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, p. 4-3. (Int'l Conference on Consumer Electronics, Jan. 9-13, 2008).

F. Nuesch, et al, Importance of Indium Tin Oxide Surface Acido Basicity for Charge Injection into Organic Materials Based Light Emitting Diodes. *J. Appl. Phys.*, 87, 7973, 2000.

Glatkowski, (2003) Carbon Nanotube Based Transparent Conductive Coatings. *Int'l SAMPE Symposium & Exhibition, Advanced Materials in the Global Economy—Applications, Emerging Markets and Evolving Technologies*, Book 2, pp. 2146-2152.

H. Scher and EW Montroll, Anomalous Transit-time Dispersion in Amorphous Solids. *Phys. Rev.*, B12, 2455, 1975.

M.A. Hopper and V. Novotny, An Electrophoretic Display, Its Properties, Model, and Addressing. *IEEE Trans. Electr. Dev.* 26/8: pp. 1148-1152, 1979.

P.M. Bosenberger and D.S. Weiss, "Photoreceptors: Organic Photoconductors" in "Handbook of Imaging Materials" edited by A.S. Diamond, pp. 379, 1991, Marcel Dekker, Inc. (Unable to obtain year 1991 version; attached is year 2002 version.) (first author name should be Borsenberger).

S.A. Van Slyke, et al, Organic Electroluminescent Devices with Improved Stability. *Appl, Phys. Lett.*, 69,2160, 1996.

Reg. No. 53332-49-3, Nov. 16, 1984 ( U.S. Appl. No. 11/409,520 office action dated Oct. 24, 2008).

* cited by examiner

COMPOSITION AND PROCESS FOR SEALING MICROCELLS

This application claims the benefit of U.S. Provisional Application No. 62/065,575, filed Oct. 17, 2014; which is incorporated herein by reference in its entirety.

BACKGROUND

An electrophoretic display (EPD) is a non-emissive device based on the electrophoresis phenomenon influencing charged pigment particles dispersed in a solvent or solvent mixture. An EPD typically comprises a pair of spaced-apart electrode layers. At least one of the electrode layers, typically on the viewing side, is transparent. An electrophoretic fluid composed of a dielectric solvent with charged pigment particles dispersed therein is enclosed between the two electrode layers.

An electrophoretic fluid may have one type of charged pigment particles dispersed in a solvent or solvent mixture of a contrasting color. In this case, when a voltage difference is imposed between the two electrode layers, the charged pigment particles migrate by attraction to the side of polarity opposite that of the pigment particles. Thus, the color showing at the transparent electrode layer side may be either the color of the solvent or the color of the pigment particles. Reversal of polarity of applied voltage difference will cause the particles to migrate to the opposite side, thereby reversing the color.

Alternatively, an electrophoretic fluid may have two types of pigment particles of contrasting colors and carrying opposite charge polarities, and the two types of pigment particles are dispersed in a clear solvent or solvent mixture. In this case, when a voltage difference is imposed between the two electrode layers, the two types of pigment particles would move to the opposite ends. Thus one of the colors of the two types of the pigment particles would be seen at the viewing side.

In another alternative, multiple types of pigment particles of different colors are present in an electrophoretic fluid for forming a highlight or multicolor display device.

U.S. Pat. Nos. 6,930,818 and 6,933,098 describe technology for the preparation of an electrophoretic display based on cup-like microcells. The contents of both patents are incorporated herein by reference in their entirety.

Briefly, the microcells may be prepared by microembossing or imagewise exposure, and they are filled with an electrophoretic fluid. The filled microcells are then sealed with a sealing layer, which can be accomplished by a one-pass method or a two-pass method. The electrophoretic display film may also comprise an adhesive layer and a primer layer.

The microcell layer, sealing layer, adhesive layer and primer layer in an electrophoretic display preferably have an electrical resistivity within a certain range, $10^7$ to $10^{10}$ ohm·cm, in order to ensure adequate optical performance of an electrophoretic display. This desired level of electrical resistivity, however, is lower than the electrical resistivity of the polymeric materials available for forming these layers.

In order to achieve the desired electrical resistivity, dopant molecules may be added into a composition for forming the dielectric layer, to reduce the electrical resistivity. However because dopant molecules are very active molecules, there is a risk that they may travel into other components of a display device. For example, in the case of a sealing layer which is in contact with an electrophoretic fluid, introduction of the dopant molecules into fluid, even in a minute amount, may cause the performance of the display device to be negatively impacted.

Alternatively, humectants may be added into a composition for forming the dielectric layer to raise the moisture content in the composition, resulting in a lower electrical resistivity. Such approach, however, would render the display device to be extremely moisture dependent and its performance could become sensitive to environmental temperature and moisture changes.

DETAILED DESCRIPTION OF THE INVENTION

Figure 1:
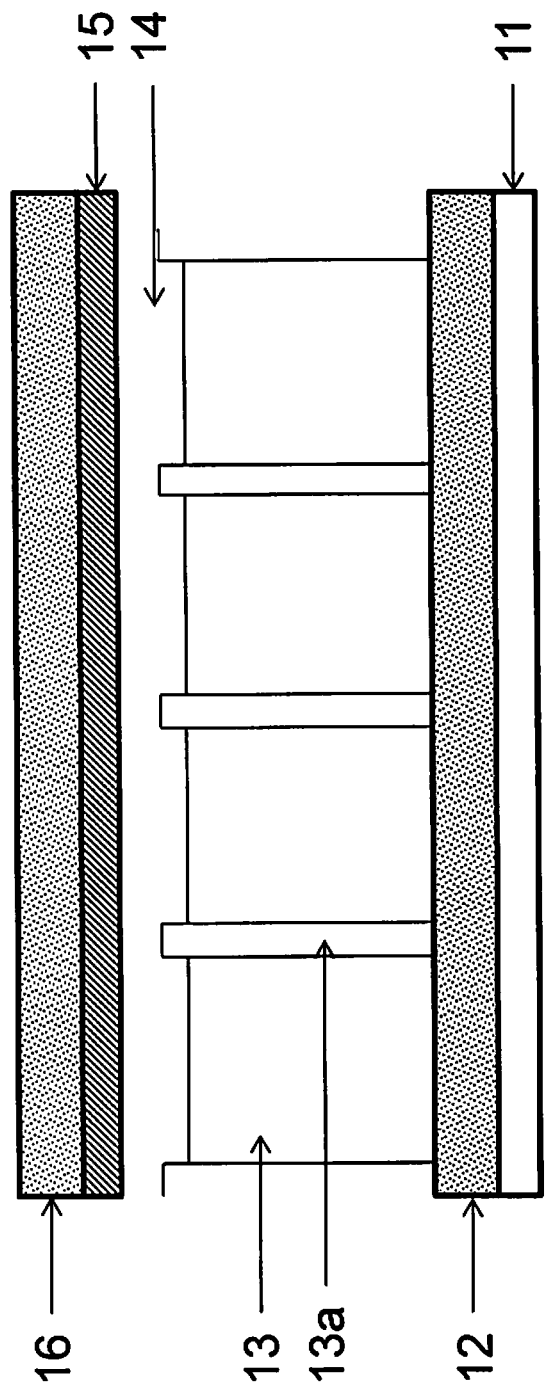
FIGS. 1 and 2 depict an electrophoretic display film.

U.S. Pat. Nos. 6,930,818, 6,933,098, 6,859,302, 6,751,008, 6,867,898 and 6,788,449 describe technology for the preparation of an electrophoretic display based on cup-like microcells. As shown in FIG. 1, microcells (13) separated by partition walls (13a) may be formed on a transparent electrode layer (12) which is laminated to a transparent substrate (11). The microcells formed are filled with an electrophoretic fluid (not shown) and the filled microcells are then sealed with a sealing layer (14). A backplane (16) is laminated over the sealing layer (14), optionally with an adhesive layer (15). It is also possible to have a primer layer (not shown) between the microcells (13) and the transparent electrode layer (12).

Figure 2:
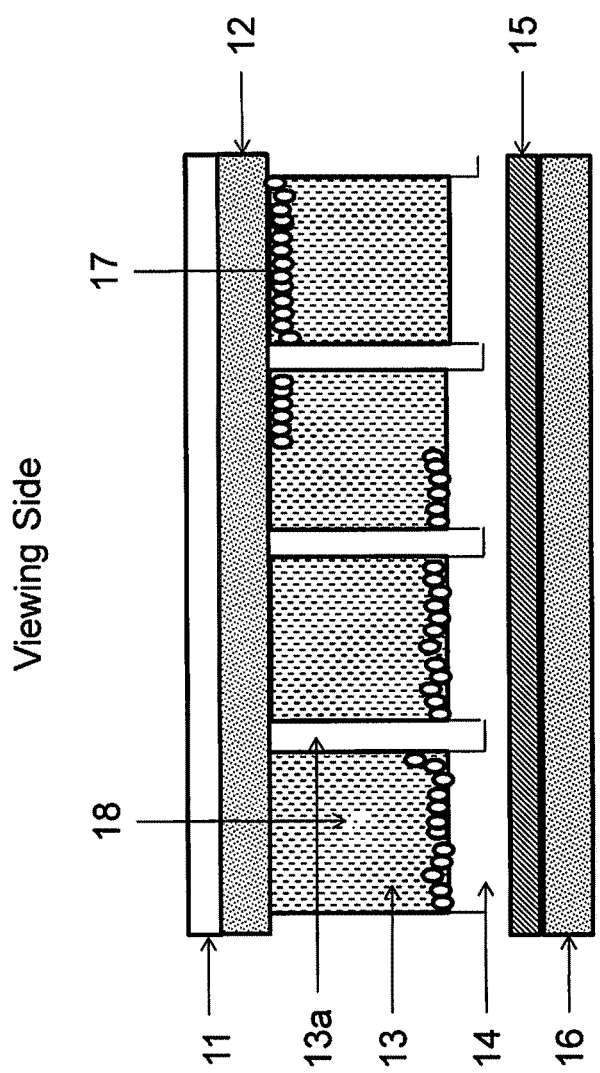

FIG. 2 is a cross-section view of a film structure of such an electrophoretic display, with the transparent electrode layer (12) on the viewing side, and the sealing layer (14), the adhesive layer (15) and the backplane (16) on the non-viewing side.

The electrophoretic fluid filled in the microcells (13) comprises charged pigment particles (17) dispersed in a solvent or solvent mixture (18).

In the context of the present invention, the microcell layer (including partition walls but excluding the display fluid filled therein), the sealing layer, the adhesive layer and the primer layer may each be referred to as "a dielectric layer".

The present invention is directed to a composition for a dielectric layer, which comprises a mixture of conductive filler materials consisting of carbon nanotube and graphite. The dielectric layer formed from the composition has a volume resistivity within a preferred target range of $10^7$ to $10^{10}$ ohm cm.

The two conductive filler materials may be in the form of nano-structures. The term "nano-structures", in the context of the present invention, refers to structures having at least one dimension which is smaller than 500 nm, or the range of UV-visible scattering light (about 0.15 to about 0.3 μm), or a typical short range surface roughness of a plastic film (about 0.05 to about 0.1 μm). The other dimension(s), if greater than 500 nm, are preferably less than 20 μm.

Each of the two conductive fillers in the dielectric layer usually has a volume resistivity lower than $10^4$ ohm cm. The resistivity reduction in a dielectric layer is influenced by the concentration and dispersion/exfoliation of the conductive fillers.

Carbon nanotubes are cylindrical structures composed of $sp^2$ carbon bonds. This type of filler material may have a relative low resistivity (i.e., high conductivity). Therefore, when used alone in a composition for forming a dielectric layer, the desired volume resistivity of a dielectric layer may be achieved at a relatively lower concentration of the material.

However, carbon nanotubes used alone have certain disadvantages. For example, the size distribution of the material in the resulting dielectric layer is found to vary widely, especially when the nanotube loading is high. This will cause the dielectric layer to have thickness variations and/or defects.

In addition, if only carbon nanotubes are used, the area having nanotube aggregates will have a resistivity different from that in other areas where no aggregates are present. This non-uniformity in resistivity would lead to image defects in the driving process.

Furthermore, when only carbon nanotubes are used, the in-plane resistivity reduction is significant which could cause text-blurring (i.e., blooming).

Graphite, on the other hand, is relatively easy to be uniformly dispersed into a dielectric layer composition. However, graphite is less conductive (i.e., higher resistivity) than carbon nanotubes, and therefore a higher concentration is required in order for the dielectric layer to have the desired resistivity.

The present inventor has now found that the combination of carbon nanotubes and graphite has unexpected advantages. For example, when graphite and carbon nanotubes are combined, the problem with the wide size distribution of carbon nanotubes is less pronounced, especially if a higher concentration of graphite is used. In one embodiment, the concentration of graphite in the dielectric layer may be 3 to 18% by weight, preferably 4 to 7%, higher than the concentration of carbon nanotubes.

Furthermore, the combination also reduces or eliminates the undesired blooming phenomenon caused by carbon nanotubes.

It has also been found that in order to achieve the desired resistivity of a dielectric layer, the individual concentration of carbon nanotubes or graphite in the dielectric layer may be lower than the concentration of carbon nanotubes or graphite if used alone.

The dielectric layer formed according to the present invention which has a desired electrical resistivity (e.g., $10^7$ to $10^9$ ohm·cm). In addition, the dielectric layer is expected to also show better barrier properties, less moisture and temperature dependence and improved anisotropic properties.

In the dielectric layer formed according to the present invention, there may be about 0.01 to 7% by weight, preferably about 1 to 5% by weight, and more preferably about 3 to 4% by weight, of carbon nanotube, and there may be about 0.1 to 20% by weight, preferably about 3 to 17% by weight, and more preferably about 6 to 13% by weight, of graphite.

The total concentration of the two filler materials in the dielectric layer is preferably less than 18% by weight, and more preferably less than 14% by weight.

The term "about" refers to ±5% of the indicated value.

In one embodiment, the composition may further comprise one or more types of non-conductive filler. Non-conductive fillers suitable for the present invention may include, but are not limited to, clay, silica, silsesquioxane, polymer particles and latexes. The non-conductive fillers may act as a rigid surfactant to facilitate dispersion and stabilization of the conductive fillers in the dielectric layer composition. Furthermore, the non-conductive fillers could take up a certain amount of space in the dielectric layer, and the conductive fillers would be excluded from the space occupied by the non-conductive fillers, hence reducing the amount of conductive fillers needed to reach desired resistivity.

The non-conductive fillers may also be in the form of a nanostructure, as described above, or in the form of organic or inorganic particles or aggregates overcoated with, or formed from, the non-conductive filler materials mentioned above.

When non-conductive fillers are mixed with conductive fillers, the ratio of the total weight of the conductive fillers to the total weight of the non-conductive filler in the dielectric layer is preferably in the range of 1:100 to 100:1, more preferably in the range of 5:1 to 30:1. When the ratio is properly controlled, desired electrical resistivity can be achieved.

In preparing a composition of the present invention, the filler materials may be individually added to a traditional dielectric layer composition.

Alternatively, the filler materials may be first mixed to form a master batch of the fillers. The mixture may also contain other additives as dispersing aids, such as cellulose, polyvinyl alcohol or polyvinylpyrrolidone. The master batch is then added to a traditional dielectric layer composition.

Examples of essential components for the dielectric layers may be found in U.S. Pat. Nos. 6,930,818, 7,347,957, 8,830,561 and 7,880,958 and U.S. patent application Ser. No. 13/686,778, the contents of all of which are incorporated herein by reference in their entirety.

Examples of components in a composition for forming microcells, may include, but are not limited to, thermoplastic or thermoset materials or a precursor thereof, such as multifunctional vinyls including, but not limited to, acrylates, methacrylates, allyls, vinylbenzenes, vinylethers, multifunctional epoxides and oligomers or polymers thereof, and the like. Multifunctional acrylate and oligomers thereof are often used. A combination of a multifunctional epoxide and a multifunctional acrylate is also useful to achieve desirable physico-mechanical properties of the microcells. A low Tg (glass transition temperature) binder or crosslinkable oligomer imparting flexibility, such as urethane acrylate or polyester acrylate, may also be added to improve the flexure resistance of the embossed microcells.

Further examples of composition for microcells may comprise a polar oligomeric or polymeric material. Such a polar oligomeric or polymeric material may be selected from the group consisting of oligomers or polymers having at least one of the groups such as nitro ($-NO_2$), hydroxyl ($-OH$), carboxyl ($-COO$), alkoxy ($-OR$ wherein R is an alkyl group), halo (e.g., fluoro, chloro, bromo or iodo), cyano ($-CN$), sulfonate ($-SO_3$) and the like. The glass transition temperature of the polar polymer material is preferably below about 100° C. and more preferably below about 60° C. Specific examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

Alternatively, the microcell composition may comprise (a) at least one difunctional UV curable component, (b) at least one photoinitiator, and (c) at least one mold release agent. Suitable difunctional components may have a molecular weight higher than about 200. Difunctional acrylates are preferred and difunctional acrylates having an urethane or ethoxylated backbone are particularly preferred. More specifically, suitable difunctional components may include, but are not limited to, diethylene glycol diacrylate (e.g., SR230 from Sartomer), triethylene glycol diacrylate (e.g., SR272 from Sartomer), tetraethylene glycol diacrylate (e.g., SR268 from Sartomer), polyethylene glycol diacrylate (e.g., SR295, SR344 or SR610 from Sartomer), polyethylene glycol dimethacrylate (e.g., SR603, SR644, SR252 or SR740 from Sartomer), ethoxylated bisphenol A diacrylate (e.g., CD9038, SR349, SR601 or SR602 from Sartomer), ethoxylated bisphenol A dimethacrylate (e.g., CD540, CD542, SR101, SR150, SR348, SR480 or SR541 from Sartomer), and urethane diacrylate (e.g., CN959, CN961, CN964, CN965, CN980 or CN981 from Sartomer; Ebecryl 230, Ebecryl 270, Ebecryl 8402, Ebecryl 8804, Ebecryl 8807 or Ebecryl 8808 from Cytec). Suitable photoinitiators may include, but are not limited to, bis-acyl-phosphine oxide, 2-benzyl-2-(dimethylamino)-1-[4-(4-morpholinyl) phenyl]-1-butanone, 2,4,6-trimethylbenzoyl diphenyl phosphine oxide, 2-isopropyl-9H-thioxanthen-9-one, 4-benzoyl-4'-methyldiphenylsulphide and 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propane-1-one, 2,2-dimethoxy-1,2-diphenylethan-1-one or 2-methyl-1-[4-(methylthio)phenyl]-2-morpholinopropan-1-one. Suitable mold release agents may include, but are not limited to, organomodified silicone copolymers such as silicone acrylates (e.g., Ebecryl 1360 or Ebecryl 350 from Cytec), silicone polyethers (e.g., Silwet 7200, Silwet 7210, Silwet 7220, Silwet 7230, Silwet 7500, Silwet 7600 or Silwet 7607 from Momentive). The composition may further optionally comprise one or more of the following components, a co-initiator, monofunctional UV curable component, multifunctional UV curable component or stabilizer.

Examples of essential components in a sealing composition may include, but are not limited to, thermoplastic or thermoset and their precursor thereof. Specific examples may include materials such as monofunctional acrylates, monofunctional methacrylates, multifunctional acrylates, multifunctional methacrylates, polyvinyl alcohol, polyacrylic acid, cellulose, gelatin or the like Additives such as a polymeric binder or thickener, photoinitiator, catalyst, vulcanizer, filler, colorant or surfactant may be added to the sealing composition to improve the physico-mechanical properties and the optical properties of the display.

For an organic-based display fluid, the sealing material may be a water soluble polymer with water as the sealing solvent. Examples of suitable water soluble polymers or water soluble polymer precursors may include, but are not limited to, polyvinyl alcohol; polyethylene glycol, its copolymers with polypropylene glycol, and its derivatives, such as PEG-PPG-PEG, PPG-PEG, PPG-PEG-PPG; poly(vinylpyrolidone) and its copolymers such as poly(vinylpyrrolidone)/vinyl acetate (PVP/VA); polysaccharides such as cellulose and its derivatives, poly(glucosamine), dextran, guar gum, and starch; gelatin; melamine-formaldehyde; poly(acrylic acid), its salt forms, and its copolymers; poly (methacrylic acid), its salt forms, and its copolymers; poly (maleic acid), its salt forms, and its copolymers; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymer functionalized with quaternary ammonium groups, such as poly(2-methacryloxyethyltrimethylammonium bromide), poly(allylamine hydrochloride). The sealing material may also include a water dispersible polymer with water as a formulating solvent. Examples of suitable polymer water dispersions may include polyurethane water dispersion and latex water dispersion. Suitable latexes in the water dispersion include polyacrylate, polyvinyl acetate and its copolymers such as ethylene vinyl acetate, and polystyrene copolymers such as polystyrene butadiene and polystyrene/acrylate.

Examples of essential components in an adhesive composition may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. The adhesive may also contain polyurethane dispersions and water soluble polymer selected from the group consisting of polyvinyl alcohol; polyethylene glycol and its copolymers with polypropylene glycol; poly(vinylpyrolidone) and its copolymers; polysaccharides; gelatin; poly (acrylic acid), its salt forms, and its copolymers; poly (methacrylic acid), its salt forms, and its copolymers; poly (2-dimethylaminoethyl methacrylate); poly(2-ethyl-2-oxazoline); poly(2-vinylpyridine); poly(allylamine); polyacrylamide; polymethacrylamide; and a cationic polymer functionalized with quaternary ammonium groups. The adhesive layer may be post cured by, for example, heat or radiation such as UV after lamination.

Examples of essential components in a primer layer composition may include, but are not limited to, a thermoplastic or thermoset material or a precursor thereof, such as polyurethane, a multifunctional acrylate or methacrylate, a vinylbenzene, a vinylether, an epoxide or an oligomers or polymer thereof.

EXAMPLE

Procedure

Three solutions containing the same main sealing component and various amounts of conductive filler(s) were prepared. The solutions were individually coated on an ITO/PET film and oven dried at 100° C. to obtain three sample films, each with a thickness of 25 µm.

In addition to the main sealing component, Sample 1 was determined to have 3.9% by weight of carbon nanotube and 9.8% by weight of graphite; Sample 2 was determined to have 15% by weight of graphite; and Sample 3 was determined to have 5% by weight of carbon nanotube.

The three samples were individually laminated to conductive layers in preparation for testing of volume resistivity, and placed under 33% relative humidity for 10 days to reach equilibrium.

To measure the volume resistivity of each film, a voltage of 15V was applied to a 5 cm×5 cm square area of the conductive layers to which the sample film was laminated, and the current generated across the layers was recorded by a Keithley 6487 picoammeter. The resistivity of each film was then calculated based on the voltage applied, the current detected and the sealing thickness within the test area.

Results:

Sample 1 was determined to have a volume resistivity of $2.2 \times 10^9$ ohm cm. Sample 2 was determined to have a volume resistivity of $5.9 \times 10^9$ ohm cm, more than double the resistivity of Sample 1.

Based on the results, because of the higher resistivity (i.e., lower conductivity), Sample 2 would be less effective than Sample 1, as a dielectric layer in an electrophoretic display, for an electric field to transmit through to the charged particles (in a fluid), which could cause slower movement of the particles, thus less satisfactory optical performance.

Sample 3 showed aggregates of larger than 20 μm, which introduced a significant amount of defects on the film. Sample 1 showed significantly less aggregates and defects.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification if need be.

What is claimed is:

1. An electrophoretic display device comprising an electrophoretic fluid and at least one dielectric layer, wherein the dielectric layer comprises a mixture of conductive filler materials consisting of carbon nanotubes and graphite, and the dielectric layer comprises 1% to 5% by weight of carbon nanotubes and 3% to 17% by weight of graphite.

2. The device of claim 1, wherein the dielectric layer comprises 3% to 4% by weight of carbon nanotubes.

3. The device of claim 1, wherein the dielectric layer comprises 6% to 13% by weight of graphite.

4. The device of claim 1, wherein the total concentration of carbon nanotubes and graphite in the dielectric layer is less than 18% by weight.

5. The device of claim 1, wherein the total concentration of carbon nanotubes and graphite in the dielectric layer is less than 14% by weight.

6. The device of claim 1, wherein the dielectric layer further comprises one or more non-conductive filler materials.

7. The device of claim 6, wherein the non-conductive filler material is clay, silica, silsesquioxane, polymer particles, or latexes.

8. The device of claim 6, wherein the ratio of the total weight of the conductive fillers to the total weight of the non-conductive filler in the dielectric layer is in the range of 1:100 to 100:1.

9. The device of claim 6, wherein the ratio of the total weight of the conductive fillers to the total weight of the non-conductive filler in the dielectric layer is in the range of 5:1 to 30:1.

10. The device of claim 1, wherein the dielectric layer is a microcell layer.

11. The device of claim 1, wherein the dielectric layer is a sealing layer enclosing the electrophoretic fluid within microcells.

12. The device of claim 1, wherein the dielectric layer is an adhesive layer.

13. The device of claim 1, wherein the dielectric layer is a primer layer.

14. The device of claim 1, wherein the dielectric layer has an electrical resistivity of $10^7$ to $10^{10}$ ohm·cm.

* * * * *